United States Patent [19]

Witt

[11] 4,001,196
[45] Jan. 4, 1977

[54] REACTIVATION OF ORGANOCHROMIUM OLEFIN POLYMERIZATION CATALYST IN PRESENCE OF OXYGEN

[75] Inventor: Donald R. Witt, Bartlesville, Okla.

[73] Assignee: Phillips Petroleum Company, Bartlesville, Okla.

[22] Filed: Dec. 4, 1974

[21] Appl. No.: 529,534

[52] U.S. Cl. .................... 526/348; 252/430; 252/431 R; 526/113; 526/126; 526/194; 526/352

[51] Int. Cl.² ............ C08F 4/02; C08F 4/22; C08F 110/02

[58] Field of Search ............ 252/430, 431 R; 260/88.2, 93.7, 94.9 D, 94.9 DA

[56] References Cited
UNITED STATES PATENTS

| | | | |
|---|---|---|---|
| 2,912,421 | 11/1959 | Juveland et al. | 260/94.9 D |
| 3,013,002 | 12/1961 | Breslow et al. | 260/94.9 C |
| 3,014,020 | 12/1961 | Balthis | 260/94.9 D |
| 3,326,871 | 6/1967 | Shepard et al. | 260/94.9 D |
| 3,709,853 | 1/1973 | Karapinka | 260/94.9 DA |

Primary Examiner—Edward J. Smith

[57] ABSTRACT

A particulate catalyst support containing titanium is heated to activation temperature and thereafter impregnated with a π bonded organochromium compound. Thereafter the chromium-containing catalyst is reactivated, at least a portion of the reactivation occurring in the presence of oxygen. Such catalysts are particularly suitable for the production of high melt index polymer from at least one mono-1-olefin containing 2 to 8 carbon atoms per molecule.

18 Claims, No Drawings

REACTIVATION OF ORGANOCHROMIUM OLEFIN POLYMERIZATION CATALYST IN PRESENCE OF OXYGEN

BACKGROUND OF THE INVENTION

This invention relates to supported titanium-containing organochromium polymerization catalysts.

Supported chromium-containing catalysts can be used to prepare olefin polymers in hydrocarbon solution to give a product having excellent characteristics from many standpoints. Supported chromium-containing catalysts can also be used to prepare olefin polymers in a slurry system wherein the polymer is produced in the form of small particles of solid material suspended in a diluent. This process, frequently referred to as a particle-form process, has the advantage of being less complex. However, one method of controlling the molecular weight of the resulting polymer in the solution process is simply to vary the temperature, with lower molecular weight (higher melt flow) polymer being produced at the higher temperature. It is readily apparent that this type of process control is severely limited in a particle-form process since any substantial increase in the temperature would cause the polymer to go into solution.

BRIEF SUMMARY OF THE INVENTION

It is an object of this invention to provide a catalyst for producing high melt flow polymer in a particle-form process;

it is a further object of this invention to provide a simplified process for producing olefin polymers;

it is yet a further object of this invention to provide an improved method of activating organochromium-containing catalysts; and it is still yet a further object of this invention to provide an improved organochromium-containing catalyst.

In accordance with this invention a particulate base containing titanium is activated at an elevated temperature, thereafter impregnated with a $\pi$ bonded organochromium compound, and finally subjected to a reactivation step at a temperature of 40°–150° F wherein the catalyst is contacted with oxygen.

DESCRIPTION OF THE PREFERRED EMBODIMENTS

Preferred supports are silicon-containing materials such as silica, silica-alumina and other silica-containing particulate supports containing titanium. These supports can be prepared by precipitation and coprecipitation techniques or by mixing silica with other refractory materials. For example, an alkali metal silicate solution such as water glass can be coprecipitated with a titanium compound such as titanyl sulfate or titanium potassium oxalate by adding said silicate to a mineral acid such as sulfuric acid, said acid containing said titanium compound, to form a hydrogel. The hydrogel is preferably aged for a time greater than one hour, washed with water to produce a substantially alkali metal-free hydrogel and then treated with a water-soluble oxygencontaining liquid organic compound to effect azeotropic distillation to remove water and form a xerogel. The titanium can be added to a titanium-free support by mixing the support with a solution of a titanium compound or by dry blending with a titanium compound. These same techniques can also be used to impart additional titanium to a coprecipitated titanium-containing cogel. For example, a hydrocarbon solution of titanium acetylacetonate or tetraisopropyl titanate can be used to impregnate the support with titanium. The total amount of titanium in the support prior to calcination is within the range of 0.5 to 10, preferably 1 to 8 weight per cent based on the total weight of the support and titanium compound.

This titanium-containing base is then calcined (activated) in air at a temperature within the range of 700° to 2000° F, preferably 900° to 1700° F for ½ to 50 hours, preferably 2 to 20 hours, to prepare it properly for the subsequent impregnation with the $\pi$ bonded organochromium compound.

The $\pi$ bonded organochromium compounds employed in the catalysts of this invention are known in the art. Preferred are the diarene chromium compounds having the following structure

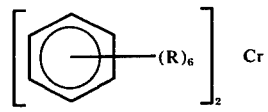

wherein R is selected from the group consisting of hydrogen and alkyl radicals having from 1 to 6 carbon atoms. Examples of these compounds include dibenzene chromium, ditoluene chromium, di-o-xylene chromium, di-p-xylene chromium, dicumene chromium, dimesitylene chromium, di(n-propylbenzene) chromium, di(1,3,5-triethylbenzene) chromium, di(1,3-diethyl-4-hexylbenzene) chromium, di(1,3-dipentylbenzene) chromium, di(1,3,5-trihexylbenzene) chromium, di(hexamethylbenzene) chromium and the like. It is believed that the chromium in these diarene compounds has a valence of 0, the two organo groups thus being the same or different ligands.

The organochromium compounds are liquids or solids soluble in many organic solvents. Preferred solvents are non-polar liquids at ambient temperatures which are sufficiently volatile to allow removal by evaporation. Examples of suitable solvents include alkanes, cycloalkanes, aromatic hydrocarbons, halogenated compounds, ethers and the like. Exemplary compounds include pentane, n-hexane, decane, cyclohexane, methylcyclohexane, benzene, xylenes, chloroform, diethyl ether, etc., and mixtures of one or more of the pure compounds. A sufficient quantity of a solution of the chromium compound is used to completely wet the support and fill the porous structure to insure even distribution of the chromium compound on the support. Generally, the solutions contain from about 0.002 to about 25 weight per cent of the organochromium compound.

A sufficient volume of the solution of the organochromium compound is taken so as to provide from about 0.01 to 30, preferably from 0.1 to 10, most preferably from 0.25 to 1 parts by weight of the organochromium compound per 100 parts by weight of the activated support. The contact between the support and metal solution is effected in a conventional way such as by slurrying and at any convenient temperature. Generally, ambient temperature is used, although temperatures ranging from about the freezing point of the solvent to as high as about 300° F can be employed during the contacting period. Contact times from a few seconds to several hours are adequate. The resulting catalyst can be dried for instance by heating under a nitrogen atmosphere.

After the contacting operation, the catalyst is reactivated by treatment with oxygen at a relatively low temperature. This treatment can be carried out at essentially room temperature or any temperature within the range of 40° to 150°, preferably 70° to 100° F. This treatment can be carried out by either introducing the oxygen into the mixture comprising the support and organochromium solution (i.e., a slurry of the catalyst in a solvent), or this mixture can be evaporated to dryness or to a condition of 2 to 50 weight per cent solvent in an inert atmosphere such as nitrogen and thereafter treated in particular form with oxygen. The oxygen treatment is preferably carried out by utilizing air although any oxygen containing atmosphere can be utilized. The amount of oxygen is more important than the time and temperature of treatment so long as the temperature is kept low. One criterion for determining the proper amount of oxygen is to observe the color of the catalyst in instances where the oxygen is simply introduced into the mixture of support and organochromium solution. The catalyst prior to introducing oxygen is green and turns yellow or orange on introduction of oxygen. Preferably an amount of oxygen is introduced sufficient to turn at least 10 per cent of the catalyst orange, and can range up to an amount 50 per cent above that necessary to turn essentially all of the catalyst orange. Generally about 0.1 to about 1, preferably 0.25 to 0.75 moles of oxygen per mole of chromium is sufficient. Preferably an amount of oxygen sufficient to turn about 1/3 to 3/4 of the catalyst orange is utilized since the improvement in melt index effected by the oxygen treatment reaches an optimum within this range and begins to fall off at higher amounts of oxygen. As noted hereinabove in another embodiment, an oxygen-containing atmosphere can simply be passed over the dried or partially dried catalyst.

The polymers produced using the catalysts of this invention are normally solid polymers of at least one mono-1-olefin containing from 2 to 8 carbon atoms per molecule. The catalysts of the invention are particularly useful for the preparation of high melt flow ethylene polymers. These preferred polymers are normally solid homopolymers of ethylene or copolymers of ethylene with another mono-1-olefin containing 3 to 8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 80–99, preferably 95–99 mole per cent of ethylene. These polymers are well suited for extrusion, blow molding, injection molding and the like.

The polymerization process using the catalyst of this invention is conducted in the gaseous phase or in liquid phase, generally in the presence of an inert hydrocarbon diluent. Suitable diluents are those hydrocarbons having from 3 to 12 carbon atoms per molecule, generally selected from paraffins, cycloparaffins and aromatics with the paraffinic hydrocarbons being more preferred. Preferred diluents include propane, n-butane, isobutane, n-pentane, isopentane, n-hexane, n-heptane, 2,2,4-trimethylpentane, cyclopentane, cyclohexane, methylcyclohexane, n-dodecane and mixtures thereof. It is preferred to have one of the previously mentioned diluents present in the liquid phase to facilitate removal of the heat of reaction. The pressure is generally in the range of 0 to 2000 psig and need be no more than sufficient to maintain the diluent in liquid phase, i.e. 50 to 750 psig.

The polymerization reaction in accordance with this invention is generally carried out within the temperature range of 100° to 500° F. Most frequently, the range is from 150° to 350° F since polymer yields are highest within this range. In a presently preferred embodiment, the temperature range is from 150° to 230° F so that the polymer particles form a suspension in the reaction mixture, i.e. particle-form process. At higher temperatures the polymer in most cases forms in solution in the diluent in the reaction zone, i.e. a solution process.

The contacting of monomer or monomers with the catalyst can be effected by any of the techniques known in the art of solid catalysis. A convenient method is to suspend the catalyst in the liquid diluent and to agitate the reaction mixture, thus maintaining the catalyst as a solid suspension in the liquid diluent. Other known catalytic contacting methods such as fixed bed, fluidized bed, gravitating bed, etc., can also be used. Reference to production of ethylene polymers according to particle-form process is found in U.S. Pat. No. 3,624,063, the disclosure of which is hereby incorporated by reference.

The particle-form process in which the catalyst of this present invention is particularly applicable is a process in which at least one olefin is polymerized at a temperature within the range of about 150°-230° F by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperature are such that the polymer produced is insoluble in the medium and is recovered in the form of solid particles. The organic medium (nonaqueous diluent) is generally a paraffin and/or cycloparaffin having from 3 to 12 carbon atoms per molecule. Representative examples include propane, butane, isobutane, pentane, isopentane, cyclohexane, n-dodecane, methylcyclohexane and the like. Pressures can range from about 100 to 700 psig or higher, and catalyst concentrations can range from 0.001 to about 1 weight per cent based on the weight of the reactor contents. The invention is of particular applicability in producing polymer in a particle-form process at a productivity of greater than 2000 pounds of polymer per pound of catalyst.

Hydrogen can be used to decrease the molecular weight of the polymers produced with the catalyst of this invention if desired (i.e., give a much higher MI), the catalyst of this invention being particularly sensitive to the beneficial effects of introducing hydrogen to control molecular weight. Partial pressure of hydrogen when hydrogen is used can be within the range of 5 to 100 psig, preferably 25 to 75 psig. The melt indices of the polymers produced in accordance with the instant invention can range from about 0.1 to about 70 or even higher.

EXAMPLE I

A coprecipitated silica-titania cogel containing 7.5 weight per cent titanium was prepared, washed and dried by azeotropic distillation with ethyl acetate. The resulting product was calcined in dry air for 5 hours at 1600° F, and then flushed with dry nitrogen and cooled to room temperature. A portion of the conditioned (activated) cogel was slurried in dry n-hexane and to it was slowly added a n-hexane solution of dicumene chromium containing 0.004 g chromium per cc sufficient to provide 1 weight per cent chromium based on the weight of the dry composite. The resulting mixture was evaporated to dryness, heated in nitrogen to 300° F and held at this condition for 1 hour before cooling to ambient temperature. Portions of the greenish colored cooled catalyst were transferred in the absence of $O_2$ to individual tubes containing a nitrogen atmosphere. One of these portions was charged to a reactor containing a nitrogen atmosphere. Dry isobutane (1¼ pounds) was charged to the reactor, the temperature was increased from ambient to reaction temperature (215° F), ethylene was charged to give 550 psig and polymerization begun. This catalyst produced a polymer of 0.93 melt index.

Each of the other portions of the catalyst was treated with a portion of dry air at ambient temperature (80° F) before charging the mixture of the reactor as before. When air contacted the catalyst, it changed from a green to an orange color. The same reaction conditions were employed as before. The following results were obtained.

| Catalyst Concentration Wt. % | Approx. Amt. of Catalyst Turning Orangish | Polymer Yield, g/g | Polymer Melt Index | HLMI MI |
|---|---|---|---|---|
| 0.012 | 0 | 3075 | 0.93 | 111 |
| 0.015 | ⅓ | 2785 | 2.76 | 76 |
| 0.015 | ¾ | 2875 | 3.08 | 72 |
| 0.015 | ≈95/100 | 3150 | 2.03 | 69 |

These data show that a small amount of oxygen surprisingly effects a change in the catalyst which gives it the ability to produce high melt index polymer even though this oxygen treatment is carried out at room temperature. Significantly greater amounts of oxygen reduce this improvement somewhat, but even with sufficient oxygen to turn substantially all of the catalyst orange, an improvement is still obtained.

While this invention has been described in detail for the purpose of illustration, it is not to be construed as limited thereby, but is intended to cover all changes and modifications within the spirit and scope thereof.

What is claimed is:
1. A process for producing a catalyst comprising:
calcining a silica-containing particulate support containing titanium in air at a temperature within the range of 700 to 2000° F.;
thereafter impregnating the thus-calcined titanium-containing support with a nonaqueous solution of a diarene organochromium compound having the following structure

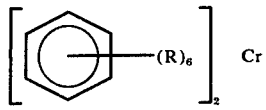

wherein R is selected from the group consisting of hydrogen and alkyl radicals having from 1 to 6 carbon atoms; and
thereafter treating the thus organochromium impregnated support with molecular oxygen at a temperature within the range of 40° to 150° F.

2. A method according to claim 1 wherein said organochromium compound is one of dibenzene chromium and dicumene chromium or mixtures thereof and is present in an amount within the range of 0.1 to 10 parts by weight per 100 parts by weight of said activated support, and said titanium is present in an amount within the range of 1–8 weight per cent based on the weight of said support.

3. A method according to claim 1 wherein said support is silica coprecipitated with a titanium compound.

4. A method according to claim 3 wherein said titanium compound coprecipitated with said silica is titanyl sulfate or titanium potassium oxalate.

5. A method according to claim 1 wherein said oxygen is supplied by introducing air into a mixture comprising said calcined support and said nonaqueous solution of said organochromium compound.

6. A method according to claim 5 wherein said contacting is carried out at room temperature.

7. A method according to claim 5 wherein said oxygen is supplied in an amount sufficient to change the color of from ⅓ to ¾ of the catalyst mixture from green to orange.

8. A method according to claim 1 wherein said treatment with oxygen is carried out while said impregnated support is in the form of a slurry in a nonaqueous diluent.

9. A method according to claim 1 wherein said oxygen is supplied in an amount sufficient to change the color of from ⅓ to ¾ of the catalyst mixture from green to orange.

10. A catalyst produced by the method of claim 9.

11. A catalyst produced by the method of claim 1.

12. A polymerization process which comprises contacting at least one polymerizable mono-1-olefin having 2–8 carbon atoms per molecule under polymerization conditions with a catalyst produced by the method of claim 1.

13. A method according to claim 12 wherein said olefin is ethylene.

14. A method according to claim 12 wherein said contacting is carried out in a liquid diluent at a temperature such that at least a substantial part of polymer produced is insoluble in said diluent.

15. A method according to claim 12 wherein said contacting is carried out at a temperature within the range of 150° to 230° F and substantially all polymer produced is in particle form.

16. A method according to claim 12 wherein said contacting is carried out in a liquid diluent selected from paraffins or cycloparaffins or mixtures thereof having 3 to 12 carbon atoms per molecule.

17. A method according to claim 16 wherein said diluent is selected from the group consisting of propane, isobutane, cyclohexane, n-dodecane, and methyl cyclohexane.

18. A method according to claim 17 wherein said diluent is isobutane.

* * * * *